United States Patent [19]

Yoshii et al.

[11] Patent Number: 4,881,417
[45] Date of Patent: * Nov. 21, 1989

[54] TRANSMISSION SYSTEM FOR VEHICLE

[75] Inventors: Takashi Yoshii, Sakai; Humitoshi Iinuma, Wakayama, both of Japan

[73] Assignee: Kubota Ltd., Osaka, Japan

[*] Notice: The portion of the term of this patent subsequent to Jan. 3, 2006 has been disclaimed.

[21] Appl. No.: 119,937

[22] Filed: Nov. 13, 1987

[30] Foreign Application Priority Data

Apr. 13, 1987 [JP] Japan ................................ 62-91670
Apr. 13, 1987 [JP] Japan ................................ 62-91671

[51] Int. Cl.⁴ ..................... B60K 17/28; B60K 25/00
[52] U.S. Cl. ................................ 74/15.84; 74/15.66; 74/15.8
[58] Field of Search ............... 74/15.4, 15.6, 15.63, 74/15.8, 15.82, 15.84, 377, 15.66, 15.69, 15.88; 192/70.27, 70.29, 70.3, 99 A

[56] References Cited

U.S. PATENT DOCUMENTS

| | | | |
|---|---|---|---|
| 2,975,656 | 3/1961 | Haverlender | 74/15.63 X |
| 3,722,301 | 3/1973 | Crooks | 74/15.63 |
| 4,208,923 | 6/1980 | Ikegami | 74/15.63 |
| 4,275,608 | 6/1981 | Brancolini | 74/15.63 |
| 4,360,091 | 11/1982 | Sada et al. | 74/15.63 X |
| 4,738,160 | 4/1988 | Sada | 74/677 X |

FOREIGN PATENT DOCUMENTS 57-104039 12/1975 Japan .
545365 5/1942 United Kingdom ............... 192/70.3

Primary Examiner—Leslie A. Braun
Assistant Examiner—Janice E. Chartoff
Attorney, Agent, or Firm—Edwin E. Greigg

[57] ABSTRACT

A transmission system for a vehicle comprising a dry type clutch mechanism, a propelling line for driving ground engaging wheels, and a PTO line. The clutch mechanism includes a drive member connected to an engine output shaft, and a clutch plate movable into and out of friction engagement with the drive member. The propelling line includes an input shaft connected to the drive member, a shuttle shift mechanism having at least one oil clutch for establishing and breaking drive transmission from the input shaft, and a change speed mechanism for receiving drive from the shuttle shift mechanism. The PTO line includes a PTO line input shaft connected to the clutch plate of the dry type clutch mechanism.

6 Claims, 6 Drawing Sheets

TRANSMISSION SYSTEM FOR VEHICLE

BACKGROUND OF THE INVENTION

1) Field of the Invention

The present invention relates to a transmission system for a vehicle, particularly a tractor.

2) Description of the Prior Art

A known transmission system for a tractor is disclosed, for example, in Japanese Laying-Open Publication (Kokai) No. 57-104039. This transmission system comprises a PTO line input shaft directly coupled to a flywheel operatively connected to an engine, and a tubular propelling line input shaft mounted on the PTO line input shaft and coupled to and uncoupled from the flywheel by a dry type frictional clutch. A wet type oil clutch device for effecting backward and forward drive switching and high and low speed range switching is connected to the propelling line input shaft at a position closer than other propelling drive change speed devices are to the engine.

In the above transmission system, generally, a wet type oil clutch is connected to the PTO line input shaft for effecting change speed on the drive through the PTO line. Since the oil clutch is expensive, there is a desire to exclude the oil clutch from the PTO line.

SUMMARY OF THE INVENTION

The object of the present invention is to provide an inexpensive transmission system including no oil clutch in its PTO line.

In order to achieve the above object, a transmission system for a vehicle according to the present invention comprises an engine output shaft, a dry type friction clutch mechanism including a drive member connected to the engine output shaft, a driven member having at least one clutch plate, frictional coupling means disposed between the drive member and the driven member, and control means for controlling the coupling means to couple and uncouple the drive member and the driven member, a propelling transmission line for driving ground engaging wheels, the propelling transmission line including propelling line input shaft connected to the drive member, transmission means having at least one oil clutch for establishing and breaking drive transmission from the input shaft, and a propelling line change speed device for receiving drive from the transmission means, and a PTO transmission line including a PTO line input shaft connected to the driven member.

In the above transmission system, the drive transmission from the engine to the PTO line input shaft is established and broken by operating the dry type friction clutch mechanism. When the propelling line change speed device is operated, the oil clutch in the propelling transmission line is disengaged.

In other words according to the transmission system of this invention, the PTO line input shaft is connected to the engine through the dry type friction clutch mechanism, and the propelling line input shaft is connected to the engine, with the oil clutch mechanism in the propelling transmission line used as the conventional main clutch. This construction dispenses with the expensive oil clutch included in the PTO transmission line of the conventional transmission system, and yet permits change speed operations to be carried out as in the prior art.

In a preferred embodiment of the invention, the propelling line input shaft comprises two parts, namely a first input shaft connected to the drive member and a second input shaft for receiving the drive from the first input shaft, and the propelling transmission line further includes means for coupling and uncoupling the first and second propelling shafts.

This construction permits the engine to be started with ease by uncoupling the first and second propelling shafts when oil in the oil clutch in the propelling transmission line is cold.

Other objects and advantages of the present invention will be apparent from the following description referring to the drawings.

DESCRIPTION OF THE PREFERRED EMBODIMENT

Figure 1:
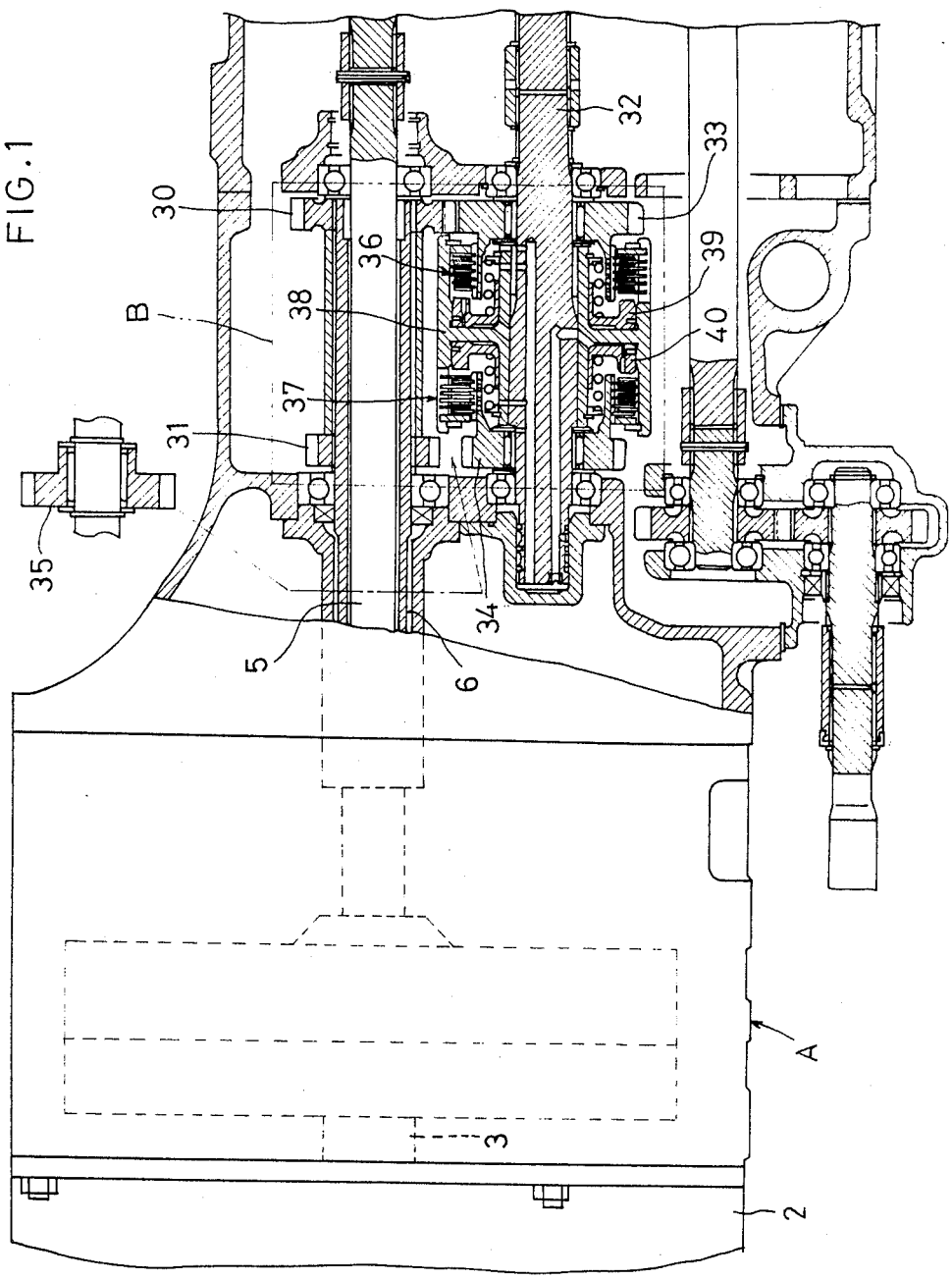
FIG. 1 is a sectional side view of a forward portion of a transmission system for a vehicle embodying the present invention.
Figure 2:
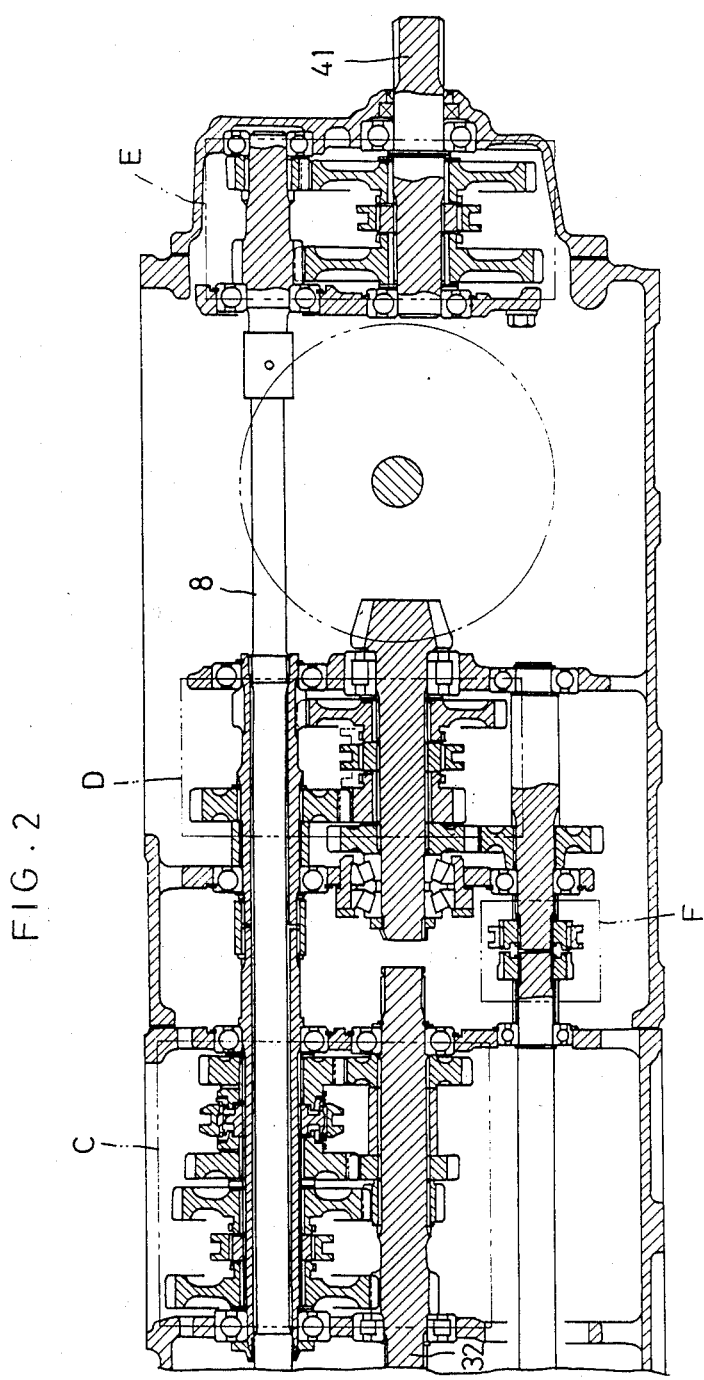
FIG. 2 is a sectional side view of a rear portion of the transmission system.

FIGS. 1 and 2 in combination show a transmission system embodying the present invention, which is installed mainly on an agricultural tractor. FIG. 1 shows a forward region of the transmission system including a clutch section A and a shuttle shift section B. FIG. 2 shows a rearward region of the transmission system including a main gear shift section C, a high and low range shift section D, a PTO gear shift section E and a front wheel drive section F. The front wheel drive section F is excluded where the tractor is the two wheel drive type.

Figure 3:
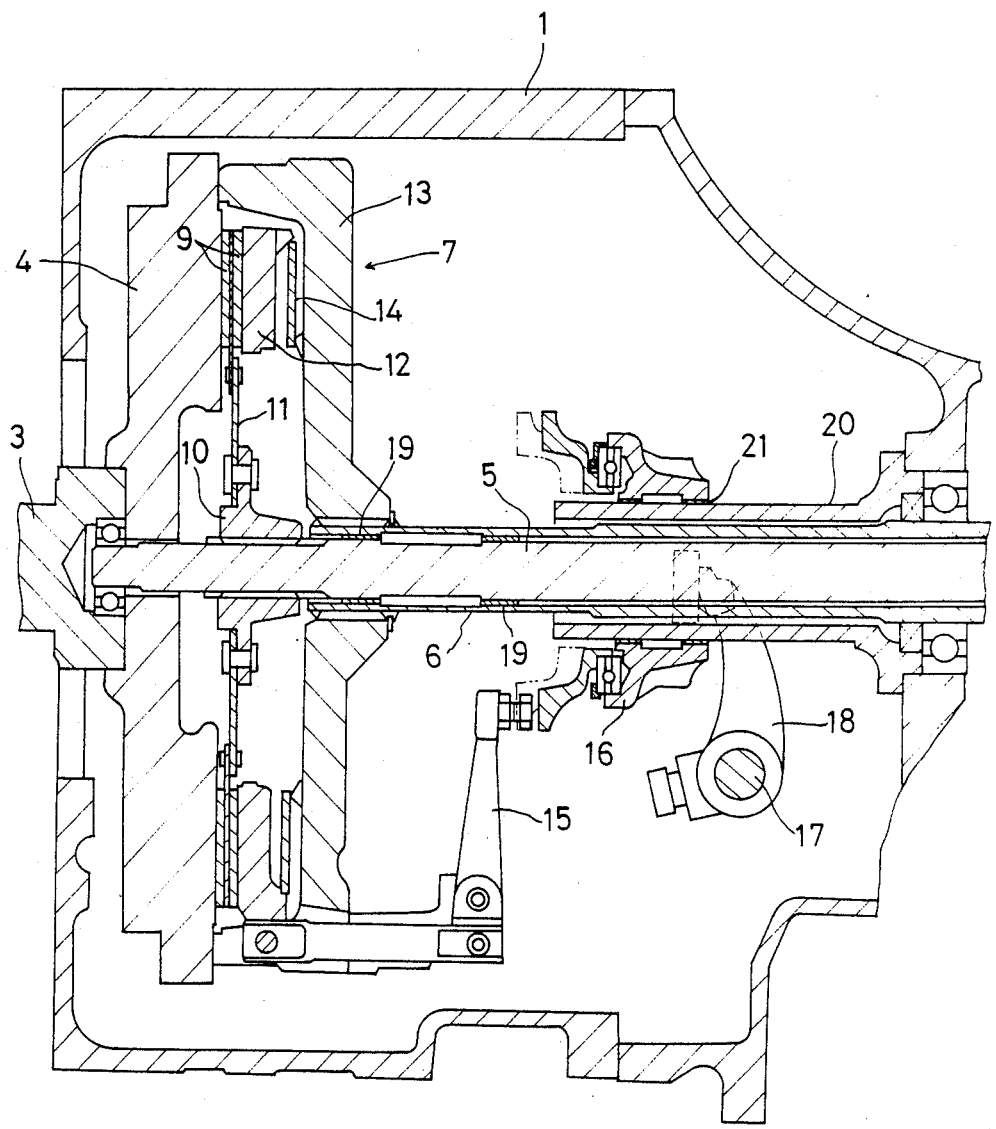
FIG. 3 is a detailed view of a clutch section.

The clutch section A is shown enlarged and in detail in FIG. 3. As seen, the clutch section A includes a clutch housing 1 disposed rearwardly of an engine 2, an engine output shaft 3, and a flywheel 4 fixed to the engine output shaft 3. Number 5 indicates a PTO line input shaft, and number 6 indicates a tubular propelling line input shaft mounted on the PTO line input shaft 5, both shafts extending longitudinally of the tractor through the clutch housing 1 and a transmission case disposed rearwardly thereof.

The PTO line input shaft 5 projects more forwardly than the propelling line input shaft 6 and includes a forward portion connectable to and disconnectable from the flywheel 4 through a dry type friction clutch mechanism 7. Further, the PTO line input shaft 5 is connected through a PTO line intermediate shaft 8 to the PTO gear shift section E.

The clutch mechanism 7 mainly comprises a clutch plate 11 including facings 9 mounted on opposite faces of one end thereof and a boss 10 at the other end thereof splined to the forward portion of PTO line input shaft 5, a pressure plate 12 for pressing the clutch plate 11 against the flywheel 4, and a bowl-shaped drive element 13 rotatable with the flywheel 4.

The clutch mechanism 7 further comprises a spring 14 elastically mounted between the pressure plate 12 and the drive element 13 for biasing the pressure plate 12 toward the flywheel 4, a release lever 15 pivotably supported by the drive element 13 for disengaging the clutch mechanism 7, a release hub 16 for operating the release lever 15, a fork 18 fixed to a fork shaft 17 for actuating the release hub 16. The release hub 16 is axially slidably mounted on a retainer tube 20 through bushes 21. The retainer tube 20 projects forwardly from a rear wall of the clutch housing 1 and surrounds the propelling line input shaft 6.

In this clutch mechanism 7, the drive element 13 acts as drive member, the clutch plate 11 as driven member, the pressure plate 12 and spring 14 as frictional coupling means, and the release lever 15, release hub 16, fork shaft 17 and fork 18 act as control means.

The propelling line input shaft 6 is relatively rotatably supported by the PTO line input shaft 5 through bushes 19, and splined at a forward end thereof to the drive element 13. Thus the propelling line input shaft 6 is rotatable with the flywheel 4 through the drive element 13. On the other hand, the PTO line input shaft 5 is switchable by the dry type friction clutch mechanism 7 between a state to receive the drive from the engine 2 and a state not to receive the drive.

As shown in FIG. 1, the propelling line input shaft 6 has a rear end extending into the shuttle shift section B to act as input shaft of a shuttle shift mechanism. This shuttle shift mechanism comprises a forward drive input gear 30 and a backward drive input gear 31 both fixed to the input shaft, a forward drive output gear 33 and a backward drive output gear 34 both relatively rotatably mounted on an intermediate shaft 32 extending parallel to the input shaft, the forward drive output gear 33 being directly meshed with the forward drive input gear 30 and the backward drive output gear 34 being meshed with the backward drive input gear 31 through a reversing gear 35, a forward drive oil clutch 36 for connecting the forward drive output gear 33 to the intermediate shaft 32, and a backward drive oil clutch 37 for connecting the backward drive output gear 34 to the intermediate shaft 32. The forward drive oil clutch 36 and backward drive oil clutch 37 are wet type clutches formed integrally with each other and mounted on the intermediate shaft 32 between the forward drive output gear 33 and backward drive output gear 34. The integrated clutches include a common disk 38 and pistons 39 and 40 slidable therein.

Forward or backward drive output from the intermediate shaft 32 is transmitted to the main gear shift section C including a four step change speed gear mechanism, the high and low range shift section D including a two step change speed gear mechanism, and finally to rear wheels of the tractor. In the case of a four wheel drive tractor, the drive is transmitted to front wheels as well through the high and low shift section D and the front wheel drive section F.

As seen from FIGS. 1 and 2, the PTO line input shaft 5 extends through the tubular propelling line input shaft 6 and through tubular intermediate shafts of the main gear shift section C and high and low range shift section D into a PTO change speed device disposed in the PTO gear shift section E at the rearmost part of this transmission system, for transmitting the drive to a PTO output shaft 41.

According to the embodiment as constructed above, the drive transmission from the flywheel 4 to the PTO line input shaft 5 is established and broken by operating the dry type friction clutch mechanism 7. Consequently, the PTO change speed device may be operated without any problem by operating the dry type friction clutch mechanism 7 at the same time to establish and break the drive transmission.

The propelling line input shaft 6 constantly receives the drive from the engine 2. Therefore, when the forward drive oil clutch 36 of the shuttle shift section B is engaged, the drive is transmitted from the propelling line input shaft 6 to the rear wheels through the forward drive input gear 30, forward drive output gear 33, disk 38, intermediate shaft 32 and through the main gear shift section C and high and low range shift section D to drive the tractor forward. When the backward drive oil clutch 37 of the shuttle shift section B is engaged, the drive is transmitted from the propelling line input shaft 6 to the rear wheels through the backward drive input gear 31, reversing gear 35, backward drive output gear 34, intermediate shaft 32 and through the main gear shift section C and high and low range shift section D to drive the tractor backward.

When a change speed operation is effected at the main gear shift section C, the oil clutches 36 and 37 of the shuttle shift section B are used as the conventional main clutch. In other words, the change speed operation is carried out as in the prior art by engaging and disengaging the oil clutches 36 and 37.

A modified clutch section A will be described next with reference to FIG. 4. This clutch section A differs from the clutch section of FIG. 3 in including a coupling device 50 operable to break the drive transmission to the propelling line input shaft 6. For this purpose, the propelling line input shaft 6 comprises two parts in this embodiment, namely a first input shaft 51 disposed adjacent the engine 2 and a second input shaft 52 disposed rearwardly.

The first input shaft 51 and a forward portion of the second input shaft 52 define splines on outer peripheries thereof, and these splines are connected to and disconnected from each other by the coupling device 50.

Figure 5:
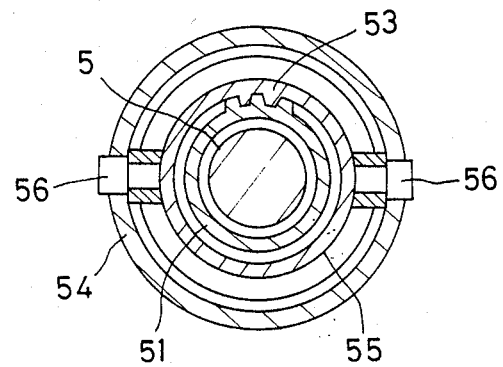
FIG. 5 is a section taken on line B—B of FIG. 4.
Figure 6:
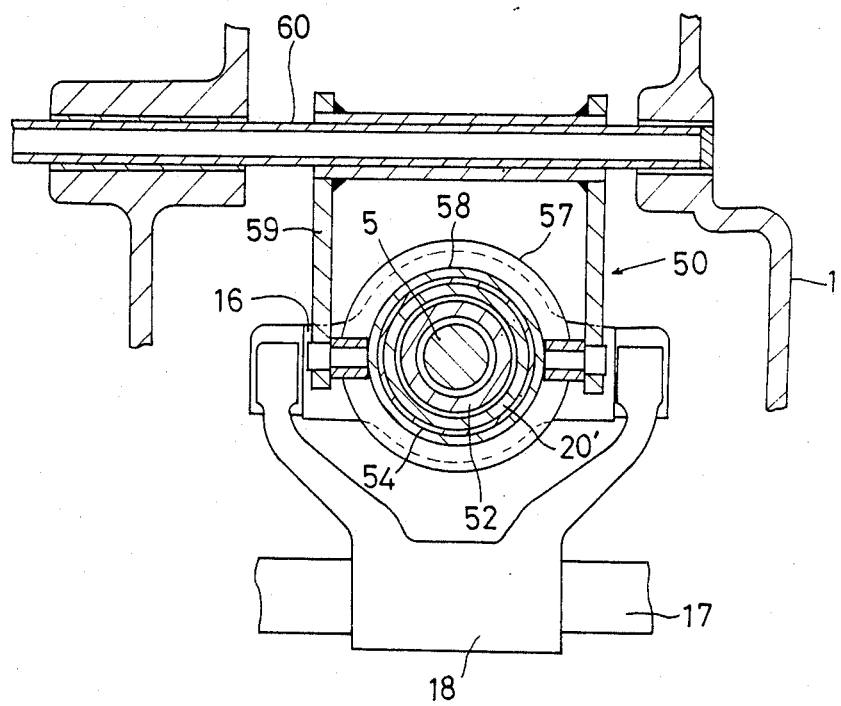
FIG. 6 is a section taken on line A—A of FIG. 4.

As also shown in FIGS. 5 and 6, the coupling device 50 comprises a shifter 53 in engagement with the splines of the first and second input shafts 51 and 52 to be unrotatable and axially slidable relative thereto, a movable tube 54 mounted on the shifter 53 and the second input shaft 52, a pair of right and left engaging members 56 fixed to opposite sides at a forward position of the movable tube 54 and in engagement with a peripheral groove 55 of the shifter 53 to permit the shifter 53 to rotate with the first and second input shafts 51 and 52, an actuating tube 57 fitted on a rear end of the movable tube 54, a fork 59 having distal ends in engagement with a peripheral groove 58 of the actuating tube 57, a fork shaft 60 extending transversely of the clutch housing 1 and fixedly carrying the fork 59, and means for rotating the fork shaft 60.

The movable tube 54 is axially slidably mounted on a retainer tube 20' which extends forwardly from the rear wall of the clutch housing 1 and surrounds the second input shaft 52. In this embodiment, the release hub 16 is mounted on the movable tube 54 to be rotatable and axially slidable relative thereto.

According to this embodiment the coupling device 50 normally is in a position to interconnect the first and second input shafts 51 and 52. In this state, the propelling drive from the engine 2 is transmitted to the rear wheels through the shuttle shift section B and the main gear shift section C as in the preceding embodiment. This embodiment which includes the coupling device 50 has the following advantage:

In this embodiment, as in the preceding embodiment, the two oil clutches 36 and 37 of the shuttle shift section B function as the conventional main clutch. Oil in the shuttle shift section B has high viscosity at a low temperature. When the engine 2 is started in this state with the two oil clutches 36 and 37 disengaged, the clutch disk of the oil clutches 36 and 37 will also rotate following the engine rotation. This results in a great load acting on the engine 2, which may hamper engine starting.

Figure 4:
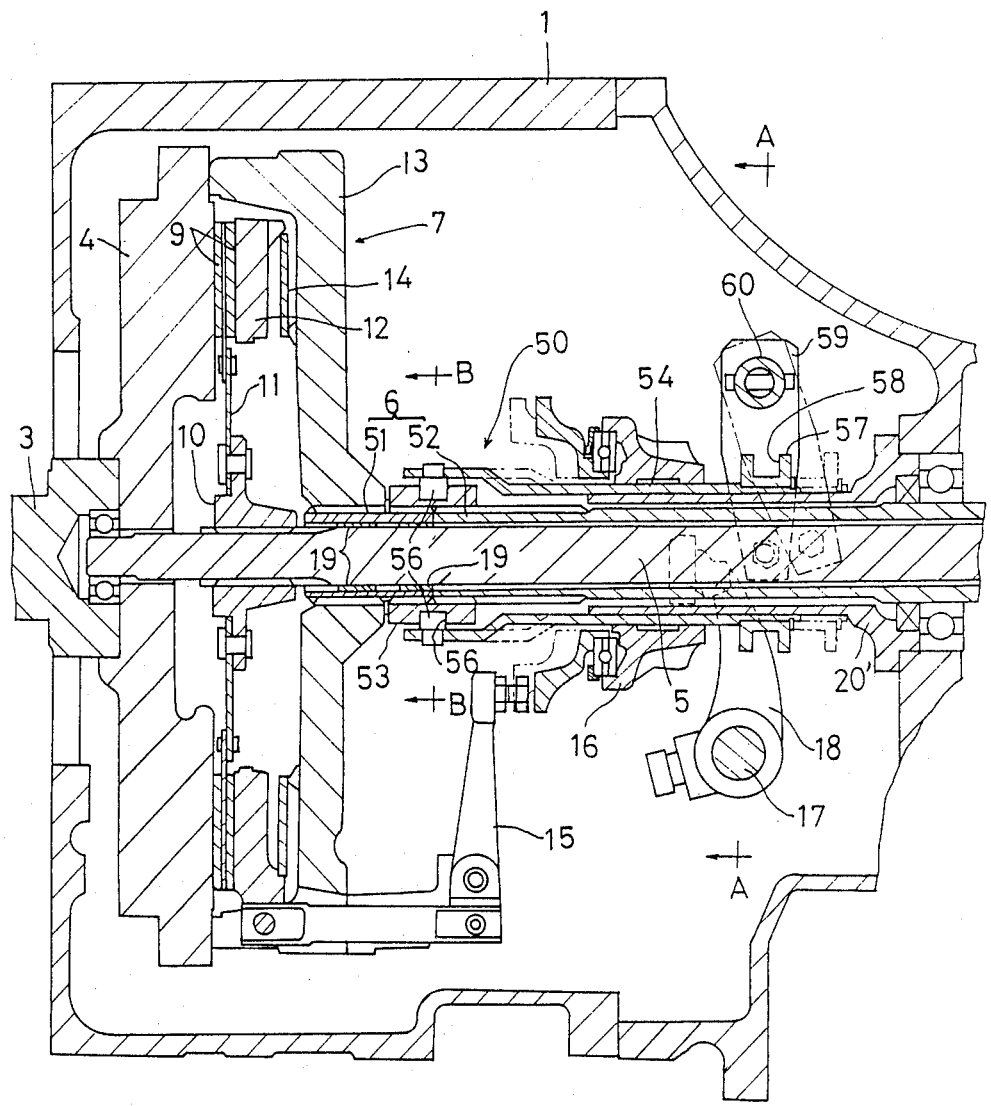
FIG. 4 is a sectional side view of a principal portion of a transmission system according to another embodiment.

In the above situation, the shifter 53 of the coupling device 50 is moved rearward out of engagement with the first input shaft 51 as shown in phantom lines in FIG. 4. This breaks the connection between the first and second input shafts 51 and 52. As a result, there occurs no rotation of the clutch disk of the oil clutches 36 and 37 following the engine rotation even when the oil is cold, which facilitates starting of the engine 2. The shifter 53 is moved to a position to interconnect the first and second input shafts 51 and 52 after the oil is heated to a high temperature.

Like reference numbers are affixed to like elements in FIGS. 3 and 4. These elements have the same functions and are not described here to avoid an unnecessary repetition.

Figure 7:
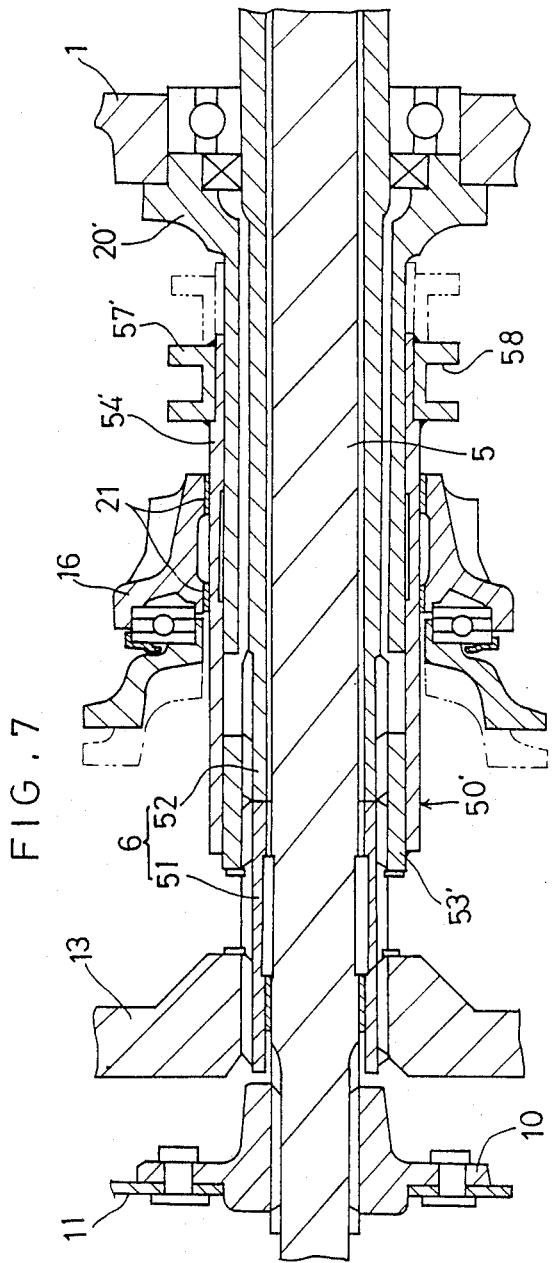
FIG. 7 is a sectional side view of a modified coupling device.

FIG. 7 shows another example of coupling device. This coupling device 50' includes a shifter 53' welded to a movable tube 54' to be rotatable in unison. The fork 59 has the distal ends in engagement with the peripheral groove 58 of an actuating tube 57' to permit the actuating tube 57' to rotate. The actuating tube 57' is welded to the movable tube 54', and the release hub 16 is relatively rotatably mounted on the movable tube 54' through bushes 21.

Figure 8:
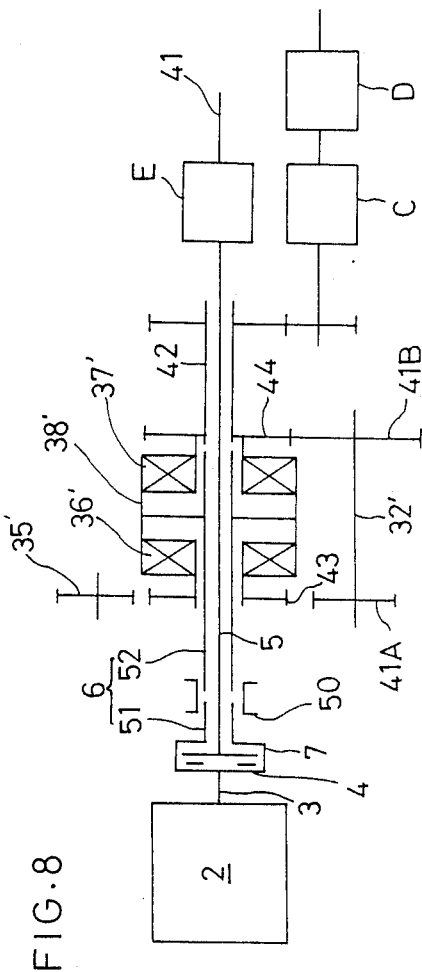
FIG. 8 is a schematic view of a transmission system according to a further embodiment.

FIG. 8 shows another example of shuttle shift section, which comprises an intermediate shaft 32' extending parallel to a rear region of the second input shaft 52, and a propelling line transmission shaft 42 mounted on the PTO line input shaft 5 rearwardly of the second input shaft 52. The intermediate shaft 32' carries a pair of forward and rearward transmission gears 41A and 41B fixed thereto. The second input shaft 52 carries a transmission gear 43 relatively rotatably mounted thereon and meshed with the transmission gear 41A through a reversing gear 35'. The propelling line transmission shaft 42 carries a transmission gear 44 fixed to a forward position thereof and meshed with the transmission gear 41B.

A wet type oil clutch mechanism for effecting backward and forward drive changeovers is interposed between the second input shaft 52 and the transmission gears 43 and 44. This clutch mechanism includes a disk 38' fixed to the second input shaft 52, a forward drive oil clutch 36' for establishing and breaking an operative connection between the disk 38' and the transmission gear 44, and a backward drive oil clutch 37' for establishing and breaking an operative connection between the disk 38' and the transmission gear 43.

The propelling line transmission shaft 42 comprising a tubular shaft mounted on the PTO line input shaft 5 is operatively connected the rear wheels through the main gear shift section C and the high and low range shift section D.

What is claimed is:

1. A transmission system for a vehicle comprising; an engine output shaft,
a dry type frictional clutch mechanism including a drive member connected to the engine output shaft, a driven member having at least one clutch plate, frictional coupling means disposed between the drive member and the driven member, and control means for controlling the coupling means to couple and uncouple the drive member and the driven member,
a propelling transmission line for driving ground engaging wheels, the propelling transmission line including propelling line input shaft connected to the drive member, transmission means having at least one oil clutch for establishing and breaking drive transmission from the input shaft, and a propelling line change speed device for receiving drive from the transmission means, and
a PTO transmission line including a PTO line input shaft connected to the driven member.

2. A transmission system as claimed in claim 1 wherein the propelling line input shaft comprises a tubular shaft mounted on the PTO line input shaft.

3. A transmission system as claimed in claim 1 wherein the transmission means of the propelling transmission line comprises a backward and forward drive changeover device.

4. A transmission system as claimed in claim 3 wherein the backward and forward drive changeover device comprises;
a forward drive input gear and a backward drive input gear both fixed to the input shaft,
a forward drive output gear and a backward drive output gear both relatively rotatably mounted on an intermediate shaft extending parallel to the input shaft, the forward drive output gear being directly meshed with the forward drive input gear and the backward drive output gear being meshed with the backward drive input gear through a reversing gear,
a first oil clutch for connecting the forward drive output gear to the intermediate shaft, and
a second oil clutch for connecting the backward drive output gear to the intermediate shaft.

5. A transmission system as claimed in claim 4 wherein the first oil clutch and the second oil clutch comprise wet type clutches formed integrally with each other and mounted on the intermediate shaft between the forward drive output gear and the backward drive output gear.

6. A transmission system is claimed in claim 3 wherein the propelling line change speed device comprises a multistep change speed gear mechanism penetrated by the PTO transmission line.

* * * * *